United States Patent
Brock et al.

(10) Patent No.: US 9,378,048 B2
(45) Date of Patent: *Jun. 28, 2016

(54) INTERRUPTION OF CHIP COMPONENT MANAGING TASKS

(71) Applicant: International Business Machines Corporation, Armonk, NY (US)

(72) Inventors: Bishop Brock, Coupland, TX (US); Tilman Gloekler, Gaertringen (DE); Andreas Koenig, Boeblingen (DE); Cedric Lichtenau, Stuttgart (DE); Preetham M. Lobo, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 105 days.

This patent is subject to a terminal disclaimer.

(21) Appl. No.: 14/302,120

(22) Filed: Jun. 11, 2014

(65) Prior Publication Data

US 2014/0344824 A1 Nov. 20, 2014

Related U.S. Application Data

(63) Continuation of application No. 14/272,901, filed on May 8, 2014.

(30) Foreign Application Priority Data

May 14, 2013 (GB) .................................. 1308598.0

(51) Int. Cl.
*G06F 9/46* (2006.01)
*G06F 9/50* (2006.01)
*G06F 9/48* (2006.01)

(52) U.S. Cl.
CPC *G06F 9/46* (2013.01); *G06F 9/485* (2013.01); *G06F 9/5038* (2013.01)

(58) Field of Classification Search
None
See application file for complete search history.

(56) References Cited

U.S. PATENT DOCUMENTS 5,057,997 A * 10/1991 Chang ..................... G06F 13/26
710/264
7,984,247 B2 7/2011 Furtek et al.
(Continued)

OTHER PUBLICATIONS

"An Inexpensive Flexible On-Chip Power-On Initialization Engine for High-End Processors", IP.com Prior Art Database Disclosure IP.com Disclosure No. IPCOM000020285D Publication, Nov. 10, 2003, 2 pages.

(Continued)

*Primary Examiner* — Adam Lee
(74) *Attorney, Agent, or Firm* — DeLizio Law, PLLC

(57) ABSTRACT

Embodiments include receiving, at a microcontroller of a chip, a request to execute a first task having a first priority. Embodiments further include determining that a second task having a second priority is currently executing. Embodiments further include determining that the first priority is higher than the second priority. Embodiments further include determining whether a value in a register indicates that the second task can be interrupted. If it is determined that the second task can be interrupted, embodiments further include triggering execution of the second task. If it is determined that the second task cannot be interrupted, embodiments further include waiting for lapse of a time period since receipt of the request to execute the first task, and interrupting the second task upon detecting lapse of the time period, or detecting, prior to the lapse of the time period, that the second task can be interrupted.

6 Claims, 3 Drawing Sheets

(56) References Cited

U.S. PATENT DOCUMENTS

| | | |
|---|---|---|
| 8,112,642 B2 | 2/2012 | Bose et al. |
| 8,347,158 B2 | 1/2013 | Mayer |
| 2002/0087649 A1* | 7/2002 | Horvitz ............... G06Q 10/107 |
| | | 709/207 |
| 2004/0025159 A1 | 2/2004 | Scheuermann et al. |
| 2007/0143514 A1* | 6/2007 | Kaushik ............... G06F 1/3203 |
| | | 710/260 |
| 2007/0300218 A1* | 12/2007 | Mann .................... G06F 9/4418 |
| | | 718/1 |
| 2008/0120616 A1* | 5/2008 | James .................... G10L 15/22 |
| | | 718/100 |
| 2011/0022871 A1 | 1/2011 | Bouvier et al. |
| 2012/0226843 A1* | 9/2012 | Lin ....................... G06F 9/4812 |
| | | 710/264 |
| 2014/0344824 A1* | 11/2014 | Brock ...................... G06F 9/46 |
| | | 718/103 |

OTHER PUBLICATIONS

Nollet, et al., "Centralized Run-Time Resource Management in a Network-On-Chip Containing Reconfigurable Hardware Tiles*", IMEC, Kapeldreef 75, 3001 Leuven, Belgium, 2005, 6 pages.

* cited by examiner

INTERRUPTION OF CHIP COMPONENT MANAGING TASKS

RELATED APPLICATIONS

This application is a Continuation of and claims the priority benefit of U.S. application Ser. No. 14/272,901 filed May 8, 2014, which claims priority under 35 U.S.C. §119 from United Kingdom Patent Application No. 1308598.0, filed on May 14, 2013, which is incorporated by reference in its entirety.

FIELD OF THE INVENTION

The present disclosure relates to the field of integrated circuit chips. More particularly, the present disclosure relates to interrupt control of chip component management tasks.

BACKGROUND

Today's integrated circuit chips comprise a large number of functions and components which need to be managed. Typically, a dedicated chip hardware component acting as service module and being interoperable with some on-chip sensors and control elements is used for performing said management.

Some management tasks must be executed more urgently than others (e.g. tasks for preventing inconsistent or harmful system states). Two approaches and corresponding chip architectures exist for ensuring that highly urgent tasks are executed quickly: A) chips comprising a single management unit using unconditional interruption of the currently executed task in favor of the urgent task, and B) chips comprising two or more management units, wherein at least one management unit is selectively reserved for performing a low priority task and wherein at least one further management unit is selectively reserved for immediately performing a high priority task if requested.

According to approach A), a chip uses a single management unit for executing chip component management tasks whereby only one task can be executed at a time. In case the execution of an urgent task is necessary, said urgent task is executed by the management unit immediately and any other task which may currently be executed at said moment is terminated abruptly. Such chips are cheap to manufacture but the abrupt interruption of a currently executed task may cause inconsistent system states or may even damage chip components. A graceful termination is not supported by this chip architecture as the option of a graceful termination bears the risk that in case the currently executed task is trapped in an infinite loop, the current task may never terminate gracefully and thus the urgent task may never be executed. In case the urgent task is to prevent damage to a chip component, the incapability to execute the urgent task may cause damage to the chip.

According to approach B), a chip comprises multiple management units. In this architecture, low-priority tasks are selectively assigned to one of said management units while an urgent task may selectively be assigned to another one of the management units. As one management unit is exclusively reserved for an urgent task, it is ensured that the urgent task can be executed immediately. This approach has the disadvantage that the management unit reserved for urgent tasks is idle most of the time. Thus, the available hardware resources are used inefficiently. Moreover, such multi-management-unit-chips are more expensive to manufacture.

SUMMARY OF THE INVENTION

It is an objective of embodiments of the invention to provide for an improved chip and corresponding method for executing urgent tasks promptly without causing harm to the chip or its components.

Said objective is solved by the subject matter of the independent claims. Advantageous embodiments are described in the dependent claims. If not explicitly stated otherwise, the features of the embodiments can freely be combined with each other.

A "service engine" as used herein is a microcontroller used for managing one or more components of a chip (i.e., initiating, monitoring and/or controlling one or more components of a chip). Preferentially, the service engine consists purely of hardware, firmware or a combination of hardware and firmware. According to preferred embodiments, the service engine is implemented as an on-chip component. This may provide for "intelligent" chips being capable of self-booting and/or comprising on-chip power management, maintenance, monitoring, clocking, error identification, and error recovery logic. In case a particular component is requested by two or more requesting instances at the same time, it may be the duty of the service engine to decide which one of the requests to be served first and which of the corresponding requestors to be assigned the requested component as a resource.

An "integrated circuit chip," "micro chip," or "chip" as used herein is a set of electronic circuits on one plate ("chip") of semiconductor material, normally silicon. This can be made much smaller than a discrete circuit made from independent components. Chips may be used in computers, mobile phones, digital home appliances, and a plurality of other devices. An example for a chip as used herein is a processor chip of IBM's PowerProcessor chip family.

A "component" of a chip as used herein may be any kind of hardware and/or firmware based component of the chip such as a memory, a data storage, a bus-interface, a network controller, a microprocessor, a GPS module, a cryptographic module, a processor or the like. A component may comprise or be connected to sensor elements used for sensing status information of the component, e.g. the temperature, the amount of free memory, or the like, for reporting this information to the service engine. Said information may be evaluated by the service engine and used as input when executing some chip-component-management tasks. A component may also comprise or be connected to control units operable to receive control commands from the service engine, the control commands being indicative if said component should be initiated, shut down or should operate in a particular manner.

A "task" as used herein is a data processing routine implemented in firmware and/or hardware elements of the service engine. Depending on the embodiment, there may be tasks for booting the chip, for shutting-down the chip, for assigning a particular chip-component to a requesting instance inside the chip or external to the chip, for switching the operation mode of a chip component, maintenance, error-recovery, component-monitoring tasks, and the like.

A "register" as used herein is a data storage component being part of the chip. The register may consist of static or dynamic RAM. The register may be implemented as processor register at the top of a memory hierarchy of a processor or as a separate register whose main function is to serve as data store for the service engine or another chip component.

A 'priority' of a task indicates the urgency of starting execution of said task. The urgency may completely or at least partially reflect a technical requirement (e.g. the requirement of preventing system inconsistencies, of preventing harm to the hardware of the chip and/or of preventing data loss). Harm and data loss may be caused, for example, due to overheating of a chip. Depending on the embodiment, the priority may be specified explicitly in a request for a particular task or in the requested task (e.g. in the form of an attribute value). Alternatively, the priority of a task may be given implicitly, for example, by the type of the requested task, the type of component having submitted a task request or some other features of the task or task request in combination with a corresponding prioritization logic implemented in the service engine.

The expression "terminating a task gracefully" as used herein encompasses the termination of said task in a controlled manner or abruptly at a state of execution at which it is guaranteed that the termination will not leave the chip or any of its components in an inconsistent and/or harmful state. Exiting a task in a controlled manner implies that the task itself or any other routine of a component of the service engine or the chip executes some processing routines which guarantee that no chip component managed by the service engine is transformed by said termination into an inconsistent and/or harmful state.

In one aspect, the invention relates to an integrated circuit chip comprising a service engine. The service engine is adapted to manage one or more components of the chip via one or more tasks. The service engine comprises a processing engine adapted for executing the one or more tasks. The service engine further comprises a data storage having stored a current state of a currently executed one of the tasks.

The service engine further comprises an interface for receiving a request for executing another one of the tasks. The request may be received from one of the components or from a requestor external to the chip. The currently executed task has a first priority and the other, requested task has another priority referred herein as "second priority."

The service engine comprises a clock which is adapted to measure a time interval having lapsed between the receiving of the request and the current time.

The service engine further comprises a control engine adapted to interrupt the currently executed task and to trigger the execution of the requested task in case:
  A) the second priority is higher than the first priority, and
  B) the stored current state indicates that the current task is gracefully interruptible; and/or b2) the measured time interval exceeds a threshold value, whereby in b2) the interruption and the triggering is executed regardless of whether the currently executed task can be or has already been terminated gracefully.

Said features may be advantageous as they may allow using single-threaded service engines which can be manufactured cheaply both for low-priority and high-priority tasks, whereby the low-priority tasks are terminated almost always gracefully and whereby it is ensured that at the latest after the lapse of the time threshold the starting of the high-priority task is guaranteed.

Said features may allow signalizing to the service engine if and when during the execution of a current, low-priority task, said task can safely be interrupted in favor of a higher priority task.

According to some embodiments, the measuring of the time interval is triggered by the receipt of the request.

If the first priority is higher than the second priority and in case the stored state indicates that the current task is not interruptible while the lapsed time period has not yet exceeded the time threshold, the service engine may trigger the graceful termination of the currently executed task by the processing engine. Upon a successful graceful termination, the stored current state value is updated to a value indicating that the current task is "interruptible." The service engine may continuously and repeatedly evaluate the current state value as long as the measured time period has not lapsed and will start executing the requested task upon determining that the updated current state value equals "interruptible."

According to some embodiments, the processing engine is merely operable to execute one task at a time. In other words, the processing engine and the corresponding service engine may be single-threaded. Thus, cheaply manufactured chips with a single-threaded service engine may provide for the same functionality regarding guaranteed service time for high priority tasks as multi-threaded service engine chips without terminating low-priority tasks un-gracefully.

According to some embodiments, the chip comprises only a single service engine for managing the chip's components. This further reduces the manufacturing costs.

According to embodiments the request comprises an attribute value being indicative of the priority of the requested task. This may be advantageous as the requesting instance is provided with means to influence the priority level of a task and thus to influence the decision whether a currently executed task is interrupted or not.

Alternatively, the priority of each task is stored as an attribute value in a storage component in association with its respective task. The priority of a task may also be given by the type of the task. In this case, the decision logic of the service engine uses the type of the requested and of the currently executed task to make a decision if the current task should be interrupted. This embodiment may be particularly advantageous for simple chip architectures where only few tasks have to be maintained. For example, there may only be supported a first task for continuously monitoring status parameters of the chip components which should normally run twenty-four hours per day and a second task for shutting down a component in case the monitored chip temperature exceeds a threshold value. The second task may only be requested occasionally for preventing harmful system states. The continuously executed first task will be gracefully terminated (if possible) whenever a task request for the second request is received by a service engine operable to identify the type of the currently executed and requested tasks.

According to some embodiments, the requested task is one of a plurality of first tasks and the currently executed task is one of a plurality of second tasks. The first tasks are responsible for booting, initializing, and/or shut-ting down a processor core of the chip, for protecting the processor core against overheating, and/or for managing the energy supply of said processor core. The second tasks are responsible for monitoring the components, in particular for monitoring a processor core of the chip, for clocking the components, for creating usage statistics, and/or for identifying errors and invalid states of the components. Each one of the first tasks has a higher priority than any one of the second tasks. Said features may be advantageous as the service engine may serve general maintenance tasks but may interrupt them gracefully for starting executing any one of the second tasks which are more important as they may be required for preventing damage from the chip and/or its components.

According to some embodiments, the processing engine is adapted for continuously monitoring the current state of the currently executed task and for updating the current state stored in the data storage accordingly. For example, the service engine may execute a low-priority monitoring task of limited duration. The task may complete its execution and terminate gracefully without any interrupt by another task. The service engine will recognize that the task has terminated and store the current state value "interruptible" (although there may currently be executed no task at all as the current task already terminated). According to another example, a medium-priority task may be requested. Upon start of the medium-priority task, the service engine will store the current state value "uninterruptible" to the storage medium, thereby preventing said task from immediate interruption by a requested task of higher priority (lower priority task will not interrupt the medium-priority task anyway). The current state value "uninterruptible" of the medium-priority task may only be interrupted by a high-priority task after its graceful termination by the service engine or in case a time period since the receipt of a corresponding task request for the high-priority task exceeded a time threshold.

In addition, or alternatively, the currently executed task comprises executable instructions which, when executed, set the current state stored in the data storage to a value specified in said instructions.

For example, a particular task may be interruptible at any time without causing harm to or causing inconsistencies in any one of the components. Upon starting execution of said task, the service engine stores the value "interruptible" to the data storage.

Or, for example, a task may comprise a first sub-task whose abrupt interruption could cause damage to the chip and comprise a second sub-task which can be interrupted abruptly without causing any damage. Upon starting said first sub-task, the service engine will store the value "uninterruptible." Upon having terminated the first sub-task and started executing the second sub-task, the service engine will store the value "interruptible" to the data storage. Thus, the decision when the current state value should be changed to "interruptible" or "uninterruptible" may be taken by some instructions which are part of a task and/or may be taken by the service engine comparing the priority of the currently executed task with the priority of the requested task and other factors such as the stored current state value, the elapsed time, etc. Said features may provide for a highly flexible, fine-grained specification whether and when a particular task can be interrupted or not.

According to embodiments, interrupting the currently executed task comprises triggering a graceful termination of the currently executed task or awaiting a graceful termination from said currently executed task's own initiative. After or during completion of the graceful termination, the current state "interruptible" is stored to the data storage. The state value "interruptible" indicates that the currently executed task has already terminated or can be terminated immediately without causing harm (i.e., can be terminated gracefully even by an immediate interruption). This enables the control engine to trigger the execution of the requested task in accordance with case b1). For example, upon determining that the requested task is of higher priority than the currently executed task, the processing engine may jump to a section within the instructions of the current task which specify some graceful exit commands for said task. By executing said instructions, the current task is terminated gracefully.

A task state value set to "interruptible" indicates that a currently executed task has already been terminated gracefully or that its immediate termination will not result in errors or inconsistencies of the chip or its components.

According to some embodiments, in case the measured time interval exceeds the threshold value, the service engine is adapted for setting the current state stored in the data storage to "interruptible" regardless of whether the currently executed task was or can be gracefully terminated or not. This enables the control engine to trigger the execution of the requested task in accordance with b2).

According to some embodiments, the request is one of a plurality of requests supported by the service engine. Each of the supported requests corresponds to one of the tasks. Each of the requests may have assigned a request-specific threshold value. Alternatively the task specific threshold value may be stored in a data storage of the chip in association with an identifier of the respective task. The determination if the measured time interval exceeds the threshold value is executed in respect to the threshold value being specific to said request. This may allow for a flexibly adaptable and fine-grained task management and task interruption logic executed by the service engine.

Alternatively, one single threshold value may be used for each one of the supported tasks.

According to some embodiments, any kind of task supported by the service engine is stored on a storage medium of the integrated circuit chip (e.g. in the form of Assembler instructions).

According to some embodiments, the request for executing a particular task is generated by one of the components or an on-chip component management unit. The request may comprise its request specific threshold value. The request may also be received from a requestor external to the chip (e.g. from an external hard disc controller or the like).

The service engine may be implemented as an on-chip microcontroller. The components may consist of hardware and/or firmware or a combination thereof. The tasks are computer-interpretable instructions stored on the chip (e.g. program instructions written for example in Assembler or other languages that can easily be translated into opcode). The instruction set of the service component may be adapted in a way as to execute all supported task, in particular the high-priority tasks, very efficiently. Said features may be advantageous as hardware-implemented methods can be executed more quickly than analogous software-based methods. In addition, the execution of software-based program logic may be stalled by failures of other pieces of software-based program logic, failures of executing the operating system, and the like. This cannot happen in the hardware and/or firmware based implementation of a service engine according to any one of the above embodiments.

According to some embodiments, the data store comprising the current state is a register having stored therein the current state in the form of a single bit value. The stored cur-rent state is either "interruptible" or "uninterruptible." Said features may be advantageous as a register and a single-bit representation of a state reduces the storage space consumed and also the time for reading and evaluating the stored current state value.

According to embodiments the stored current state is either "interruptible" or "uninterruptible" or "conditionally interruptible." The interruption of a currently executed task whose stored state value is 'conditionally interruptible' enables the control engine to interrupt the currently executed task in case additional conditions are met by the requested task or by components of the chip. Such additional conditions may consist of the operation mode of the service engine, additional parameters received with the request, the current time and date, a user-id and service level information in respect to a contract between a user and a cloud service provider or the like. Thus, in case the chip and its processing power are used (e.g. within a cloud infrastructure), the service level agreement with a particular user and/or the expected processing load at a particular time and date may have an impact on whether a particular task having the status "conditionally interruptible" will be interrupted in favor of the requested task or not.

For example, a first user having a service level agreement for processing power with a cloud service provider which covers a smaller amount and/or quality of service than the service level agreement of a second user with said provider, the "conditionally interruptible" state could indicate that tasks of the first user with a may be interrupted in favor of a requested task of the second user. In some use case scenarios, a particular component or resource of the chip may be assigned at least temporarily to different users (e.g. in dependence on a service level agreement), and information on the user-ID may be included in any request for a task submitted by said component or resource to the service engine. Thus, a cloud service provider may take advantage of the fine grained interrupt control mechanism provided by a state capable of being represented and stored in the form of multiple different values.

According to some embodiments, the service engine comprises a user-interface, e.g. a graphical or command-line interface, allowing a user to configure the time threshold value and/or the priority of the tasks.

In a further aspect, the invention relates to an assembly of a plurality of integrated circuit chips according to one of the above embodiments. Each chip comprises a service engine and one or more components to be managed by said service engine. The components of each chip comprise one processor core. Said core is managed by its respective service engine. For example, a main frame comprising a plurality of chips with a respective processing core may be provided. The processing core of each of said chips may be managed as a component of said chip by a respective on-chip service engine.

In a further aspect the invention relates to a computer-implemented method for managing one or more components of an integrated circuit chip via one or more tasks. The chip comprises a service engine. The method is executed by the service engine and comprises:

executing a current one of one or more tasks;
storing a current state of the currently executed task in a data storage of the chip;
receiving a request from one of the components for executing another one of the tasks, the currently executed task having a first priority, the other task having a second priority;
measuring a time interval having lapsed between the receiving of the request and the current time;
interrupting the currently executed task and triggering the execution of the requested task in case
A) the first priority is higher than the second priority, and
B1) the stored current state indicates that the current task is gracefully interruptible; and/or b2) the measured time interval exceeds a threshold value, whereby in b2) the interruption and the triggering is executed regardless of whether the currently executed task terminated gracefully or not.

BRIEF DESCRIPTION OF THE DRAWINGS

The above and other items, features and advantages of the invention will be better understood by reading the following more particular description of embodiments of the invention in conjunction with the figures wherein.

DETAILED DESCRIPTION OF THE INVENTION

Figure 1:
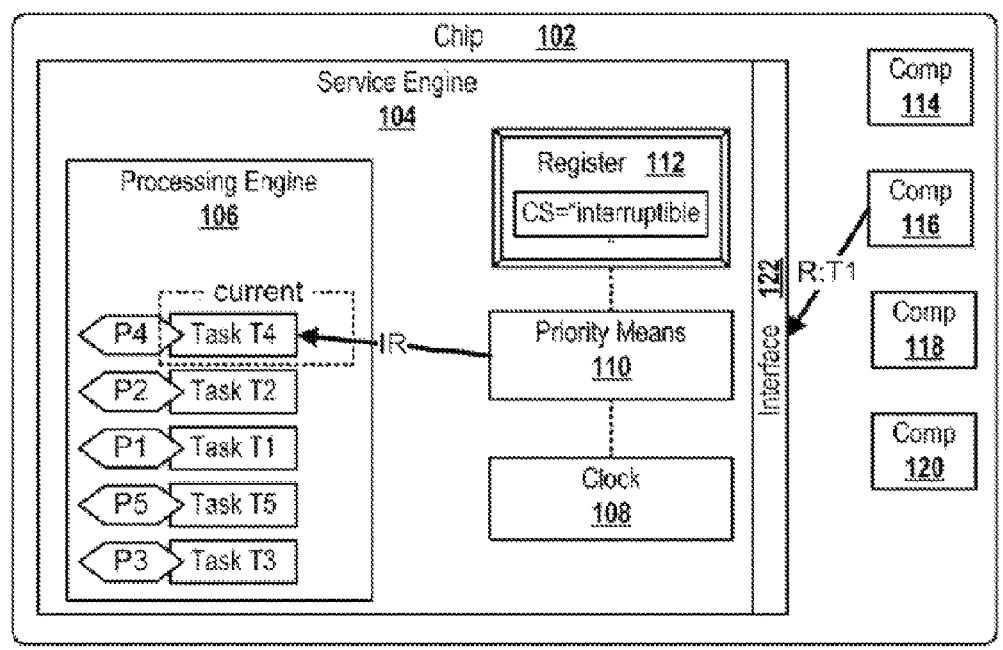
FIG. 1 is a block diagram of a chip 102 comprising a service engine 104 and several components 114-120.

FIG. 1 discloses a chip 102 which comprises a plurality of components 114-120. Said components may be, for example, a memory or storage component, a bus interface, a central processing unit, a network controller or the like. The chip further comprises a microcontroller acting as a service engine 104 which manages the chip components 114-120. The service engine 104 comprises a single threaded processing engine 106 which is operable to execute one task at a time.

According to FIG. 1, task T4 is currently executed by the processing engine. Each tasks T1-T5 supported by the service engine may be implemented as computer executable instructions embodied in firmware and/or hardware of the service engine (e.g. in the form of assembler instructions). Each task has a priority P1-P5. The priority of the task may be given by the task type or, for example, by an attribute value stored in association with the respective task or by an attribute value contained in a request for a particular task. The service engine 104 comprises a register 112 having stored a current state of the currently executed task T4. That state may be, for example, "interruptible" "uninterruptible," or "conditionally interruptible."

The service engine 104 comprises an interface 122 for receiving a request R from one of the chip components 114-120 or from a chip-external component. According to FIG. 1, component 116 sends a request for executing task T1 via the interface 122 to the service engine 104. Upon result of said request, a clock 108 of the service engine 104 starts monitoring the time period lapsing since the receipt.

The service engine comprises priority means 110 which are operable to compare the priority of the currently executed task T4 with the priority P1 of a requested task T1. The service engine comprises or is operatively coupled to a register 112 which has stored a current state value ("CS") of the currently executed task. Upon receiving the request R from component 116, the priority means 110 compares the priority P1 of the requested task T1 with the priority P4 of the currently executed task T4. In addition, the service engine evaluates the current state value CS stored in the register.

In case priority P1 exceeds priority P4 and in case the CS value is "interruptible," the service engine triggers the processing engine to immediately start executing the requested task T1. In case the current state value CS should indicate that the current task T4 is "uninterruptible," the service engine will send a command to the processing engine triggering the graceful termination of task T4. Alternatively, instead of sending said trigger command, the service engine may simply wait until the currently executed task terminates from his own initiative, thereby setting the current state value CS to "interruptible." As soon as the currently executed task has set the CS value to 'interruptible', task T4 is stopped and the execution of the requested task T1 is started. This kind of interruption is herein also considered as 'graceful', as obviously, the program instruction underlying the task T4 will only set the current state value to "interruptible" if it is ensured, by the nature of the instructions already executed and yet to follow, that an abrupt termination of said task at that particular point of execution will not cause any harm to the system. As soon as task T4 has gracefully terminated, the CS value is set to "interruptible" and the requested task T1 is executed. Only in case the graceful termination of task T4 should not be completed within a predefine time period (measured since the receipt of requests R), task T4 is forcefully terminated by the service engine to ensure that the high-priority task T1 is executed.

For example, the currently executed task T4 may be a "24/background task" (i.e., a task which is supposed to run continuously twenty-four hours per day, seven days per week). The background task is of low priority and is used for continuously monitoring the status of the components of the chip (e.g. for calculating usage statistics). If possible, task T4 should be executed continuously and should only be interrupted for urgent error correction or maintenance task such as T1. The requested task T1 may be a power management task which needs to be executed within a short time interval for preventing harm to the chip.

To ensure that the high priority task T1 can interrupt the low priority task T4 as soon as possible and to ensure that T4 continues execution as soon as T1 has terminated, component 120, which may be a monitoring microcontroller, may continuously send requests for executing task T4 to the service engine 104. Such requests won't interrupt a currently executed task T1 as requests for low-priority task T4 do not have a higher priority than the currently executed task T1. However, as soon as T1 has finished execution and the service engine has received a request for task T4, the service engine will restart executing T4.

Alternatively, in order to ensure that the high priority task T1 can interrupt the low priority task T4 as soon as possible, the currently executed task T4 may comprise program instruction which, upon termination of said task, trigger the execution of another task (e.g., a currently requested task T1 specified in the request R or another task specified in the executed instructions of task T4). Said approach may have the advantage that the repeated execution of requests for starting the execution of T4 is not necessary, thereby reducing the computational load of the service engine.

Preferentially, task T1 comprises some instructions for setting the CS value to "uninterruptible" upon starting T1 and for setting the CS value to "interruptible" upon terminating T1. Thus, as soon as the high-priority tasks T1 has finished executing, the service engine 104 receiving a request for low priority task T4 from component 120 will start the monitoring task T4. According to some embodiments, the service engine 104 may comprise further program logic and storage for temporary storing intermediate results of an interrupted low priority task and use said intermediate results for resuming the low priority task after the interrupting high-priority task has finished executing.

The priority of a task may be specified explicitly by an attribute or may be provided implicitly by the type of the task. The type of the task can be indicated by the component type sending a corresponding task request. For example, component 116 may be a power management controller and any request (including request R) submitted by said component may be identified by the service engine 104 as power management request being of high priority.

Figure 2:
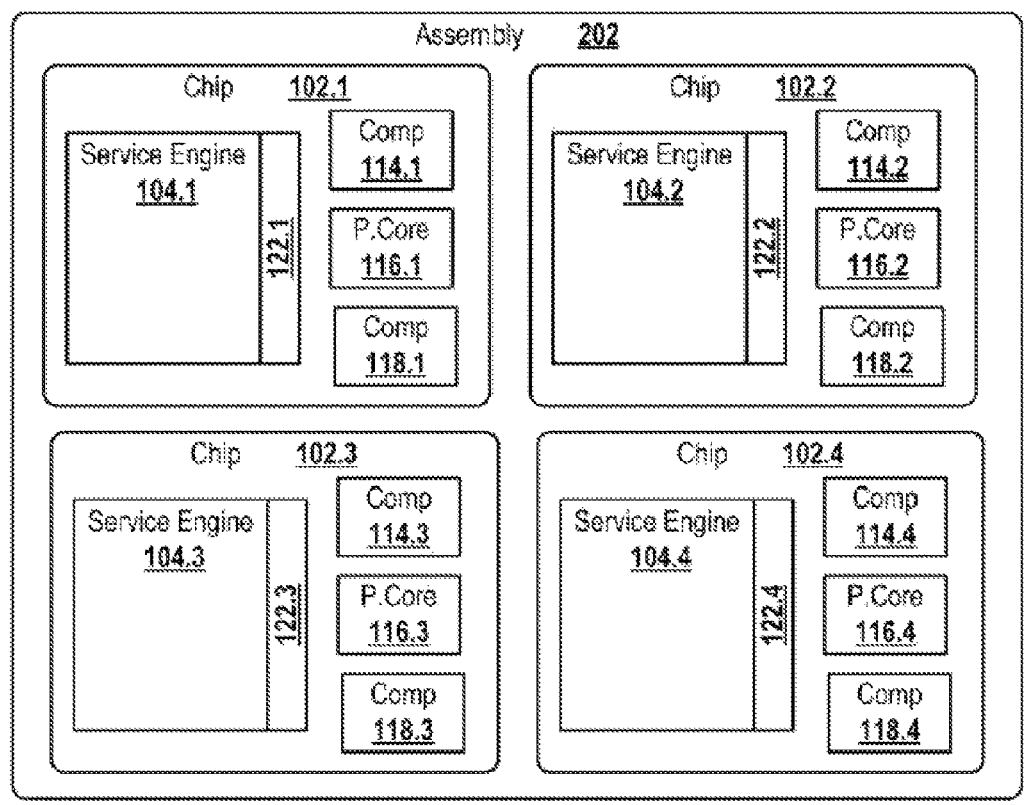
FIG. 2 in an assembly of multiple chips 102.1-102.4.

FIG. 2 depicts an assembly 202 of multiple chips 102.1-102.4 as respectively depicted in greater detail in FIG. 1. Each chip comprises one or more components and a single threaded service engine 104.1-104.4. Such an assembly may constitute a multi-core processor mainframe, wherein each "core" corresponds to one of the chips.

Figure 3:
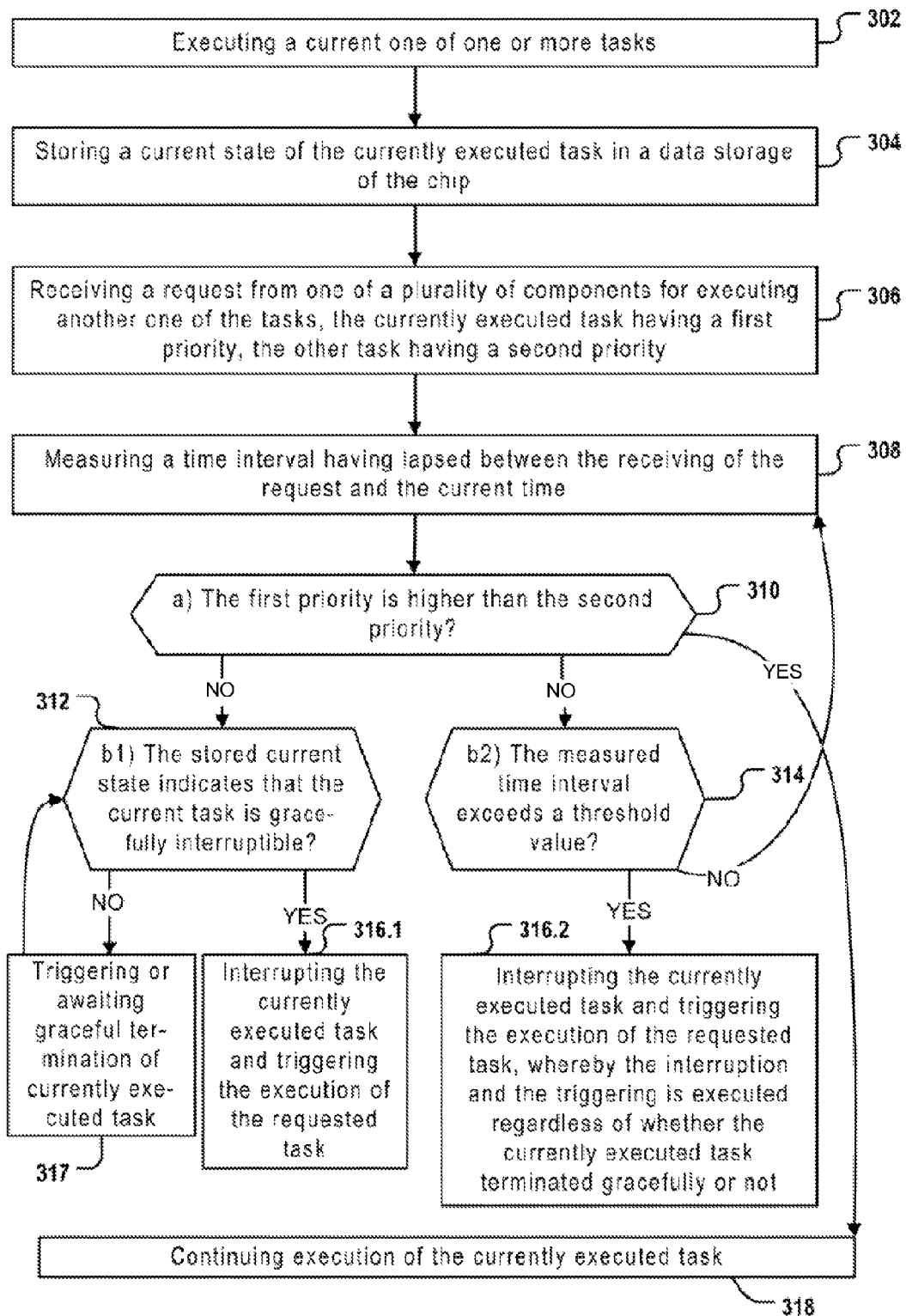
FIG. 3 is a flow chart of a method executed by the service engine or its components.

FIG. 3 depicts a method to be executed by the service engine or some of its components according to one embodiment of the invention. In step 302, the service engine 104 executes a current one T4 out of one or more tasks T1-T5. In step 304, the service engine 104 stores a current state of the currently executed task in a data storage 112 of a chip 102. In step 306, the service engine 104 receives a request R for executing a particular task T1 from one of the plurality of components 116. The currently executed task T4 has a first priority P4 and the requested task T1 has a second priority P1. Upon receiving the request R, the clock 108 starts continuously measuring in step 308 the time having lapsed since the receipt of the request R. The service engine 104, by means of the priority means 110, determines in step 310 if the first priority P1 is higher than the second priority P4. If this is not the case, then the current task T4 is continued to be executed as depicted by step 318 and the service engine 104 awaits further requests.

In case the priority of P1 is higher than P4, the service engine 104 evaluates in step 312 (path b1) if the stored current state CS indicates that the currently executed task T4 is gracefully interruptible. If this is the case, the service engine 104 interrupts T4 abruptly (in case T4 should still be running) and starts executing T1 in step 316.1.

If the stored state indicates that the current task is not interruptible, the service engine triggers in step 317 the graceful termination of the currently executed task T4 or awaits the currently executed task to set the current state value CS to "interruptible" on its own initiative and then triggers the immediate (graceful) termination of T4 and the execution of task T1 (thereby, the service engine does not "wait" indefinitely: if the time elapsed since the receipt of the request R for a higher priority task exceeds the threshold value, the currently executed task is terminated ungracefully).

In any case, upon the graceful termination of task T4, the stored current state of T4 is updated to "interruptible" and step 312 is repeated for the updated value. This time, the service engine will determine that the stored current state indicates that the current task is gracefully interruptible and will execute step 316.1 comprising the interruption of the currently executed task if any and starting execution of the requested task.

After having determined that the priority P1 exceeds P4, the service engine will (independently of path b1) repeatedly execute decision step 314 (path b2) for determining if the measured time interval since the receipt of request R exceeds a threshold value. If this is the case, the service engine will interrupt the currently executed task T4 and will trigger the execution of the requested task Ti regardless of whether the currently executed task already terminated gracefully or not. This may be implemented by simply ignoring the stored current state value CS or by forcefully setting said value to "interruptible" and executing step 312. If this is not the case, the clock of the service engine will continue executing step 308.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method comprising:
   determining a current state value associated with a currently executing task at a microcontroller of a chip;
   storing the current state value in a register;
       determining whether a first priority of a requested task is higher than a second priority of the currently executing task;
   in response to determining that the first priority is higher than the second priority, evaluating the current state value stored in the register and determining a time interval since receiving a request to execute the requested task;
   in response to evaluating the current state value stored in the register as indicating interruptible or determining the time interval exceeds a threshold, interrupting the currently executing task and triggering execution of the requested task on the chip; and
   in response to evaluating the current state value stored in the register as indicating uninterruptible and the time interval does not exceed the threshold, executing the requested task in response to detection of one member selected from the group consisting of: detection of graceful termination of the currently executing task and detection of a change to the current state value.

2. The method of claim 1, further comprising:
monitoring the current state value.

3. The method of claim 1, wherein the request to execute the requested task includes an attribute value indicating the first priority.

4. The method of claim 1, wherein the first priority and the second priority are determined based, at least in part, on a first type of the requested task and a second type of the currently executing task.

5. The method of claim 1, wherein the requested task is one of a first group of tasks and wherein the currently executing task is one of a second group of tasks, wherein tasks of the first group of tasks are responsible for one or more of booting a processor core of the chip, initializing a processor core of the chip, shutting down a processor core of the chip, protecting a processor core of the chip against overheating, and managing an energy supply of a processor core of the chip, and wherein tasks of the second group of tasks are responsible for monitoring a processor core of the chip, clocking a processor core of the chip, creating usage statistics for a processor core of the chip, and identifying errors and invalid states of a processor core of the chip.

6. The method of claim 1, wherein the request to execute the requested task indicates the threshold.

\* \* \* \* \*